Nov. 3, 1970    B. SEGMÜLLER    3,537,139
INJECTION NOZZLE FOR HOT CHANNEL-INJECTION MOLDING DEVICE
Filed July 10, 1967    3 Sheets-Sheet 1

INVENTOR.
BRUNO SEGMÜLLER
BY Jacobs & Davidson
Attorneys

United States Patent Office 3,537,139
Patented Nov. 3, 1970

3,537,139
INJECTION NOZZLE FOR HOT CHANNEL-INJECTION MOLDING DEVICE
Bruno Segmüller, Stein am Rhein, Switzerland, assignor to Segmuller AG, Stein am Rhein, Switzerland, a corporation of Switzerland
Filed July 10, 1967, Ser. No. 652,068
Claims priority, application Switzerland, Sept. 2, 1966, 12,731/66; May 17, 1967, 6,930/67
Int. Cl. B29f 1/08
U.S. Cl. 18—30                                           1 Claim

ABSTRACT OF THE DISCLOSURE

An injection nozzle arrangement for a hot channel-injection molding device which comprises, in combination, a heated distributor plate means, a mold portion cooperating with such heated distributor plate means, and means providing at least one delivery channel for the injection molding material. Each delivery channel incorporates a recess which is partially formed in the heated distributor plate means and partially in the mold portion. This mold portion is provided with a number of injection openings corresponding to the number of delivery channels. Furthermore, the invention contemplates the provision of at least one heat conducting core located internally of each delivery channel and extending at least throughout a portion of the length of such delivery channel substantially coaxially with respect to and into the associated injection opening, each such heat conducting core being in heat conducting relationship with the heated distributor plate means.

BACKGROUND OF THE INVENTION

The present invention pertains to an improved injection nozzle arrangement for a hot channel-injection molding device possessing at least one delivery channel for the injection molding material or composition, a number of injection openings corresponding to the number of delivery channels, and a heat conducting core located within each delivery channel and extending at least throughout a portion of the length of such delivery channel substantially coaxially with respect to and into the associated injection opening.

In the plastic injection molding art, the so-called hot channel-injection molding devices are preferably employed to advantage if there is to be prevented that a separate waste piece or sprue is to be simultaneously ejected with the manufactured plastic molded part, and if there is to be simultaneously obtained as quick as possible injection cycle, that is to say, a production capacity per unit of time which is as great as possible.

Now, in order to be able to fully comprehend the underlying concepts of the present invention, there is shown in FIG. 1 a conventional prior art injection nozzle for a hot channel-injection molding device. By referring to this figure, it will be recognized that at the end of the distributor channel 1 in the distributor plate 2 of a hot channel-injection molding device, there is threadably connected a nipple-like nozzle member 2. Internally of this nipple-like nozzle member 3, there is provided a bore 4 communicating with the end of the distributor channel 1. The bore 4 of such nipple-like nozzle member 3 is either cylindrical, conical or stepped. A sprue bushing 5 is arranged above this nipple-like nozzle member 3. Sprue bushing 5, in turn, is provided with a flow channel 6 leading to the injection location or entrance toward the molded article.

The sprue bushing 5 and the nozzle 3 are arranged and constructed in such a manner that between them there is formed an intermediate compartment 7. With this construction and during operation of the injection molding device, the plasticized injection molding material not only flows directly through the bore 4 of the nozzle 3 and thereafter through the flow channel 6 into the hollow mold compartment 8, rather this injection molding material also flows into the intermediate compartment 7 between the nozzle member 3 and the sprue bushing 5.

This is required and desired in each case because the thin plastic layer formed in the intemediate compartment 7 serves to thermally insulate the hot nozzle member 3 from the sprue bushing 5.

With this construction, it is necessary for each new injection molding operation to puncture through the solidified plastic layer located between the discharge opening of the nozzle member 3 and the end of the flow channel 6.

This arrangement exhibits the drawback that during the use of hot channel-injection molding molds it is never possible to obtain as faultless and clean sprue point at the finished product as such is the case with molds where the entire waste piece or sprue is separately ejected. Apart from this, the conventional nozzle depicted in FIG. 1 also has the disadvantage that it only possesses limited applicability for small parts due to the required nipple-like nozzle member 3, since the portion of the nozzle member 3 confronting the mold cannot be optionally reduced in size owing to the relatively large wall thicknesses required on account of the necessary high operating pressures.

Furthermore, there is already known to the art an injection nozzle for a hot channel-injection molding device which is equipped with a heat conducting core extending into the injection opening. This heat conducting core is internally equipped with a heating device, for instance in the form of a heating coil or spiral, in order to maintain in heated condition the injection molding material located within the injection nozzle. However, such a construction of the heat conducting core is only possible for relatively large injection nozzles since the heat conducting core cannot be optionally reduced in size owing to the heating device which is arranged internally thereof.

SUMMARY OF THE INVENTION

Accordingly, it is a primary object of the present invention to provide an improved injection nozzle arrangement for a hot channel-injection molding device which does not possess the aforementioned drawbacks of the prior art constructions.

Another, more specific object of the present invention is concerned with an improved injection nozzle arrangement for a hot channel-injection molding device which is uncomplicated in construction, relatively inexpensive to manufacture, highly reliable in operation and allows for efficient production of the injection molded articles.

Generally speaking, in order to implement these and still further objects of the present invention which will become more readily apparent as the description proceeds, the inventive injection nozzle arrangement is manifested by the features that, each heat conducting core is disposed in heat conducting relationship with the heated distributor plate means of the injection molding device, and that each delivery channel is formed by a recess partially formed or provided in the distributor plate means and partially in the female mold portion of the injection molding device.

During the production of relatively thin-walled cups or containers formed of plastic, it is possible that the forces occurring on account of the cumulation of the injection pressure, owing to the relatively small wall thickness of the article to be manufactured, tend to displace the punch or male mold portion out of its central position within the female mold portion. Consequently, considerable differences in the wall thickness can occur in the finished thin-walled cups or containers or the like.

Now, in order to avoid this drawback, it is possible, as set forth in my commonly assigned, co-pending United States patent application, Ser. No. 652,166, filed July 10, 1967 and entitled Method for the Production of Substantially Cup-Shaped and Sleeve-Shaped Containers or the Like Formed of Thermoplastic Material by Injection Molding and Improved Injection Mold for Carrying Out the Aforesaid Method, to provide in the punch or male mold portion at the region of the mold portions which corresponds to the bottom or base of the container to be manufactured a ram-like constructed locking component which, for the purpose of locking both of the mold portions, can be displaced in axial direction into a recess provided at the female mold portion.

However, with the arrangement of such a locking component it is no longer possible to provide a single, centrally arranged injection nozzle. If the injection nozzle is disposed eccentrically adjacent the locking component, then there occurs an irregular filling of the mold.

Now, if a number of injection nozzles are arranged about the locking component in order to ensure for a uniform filling of the mold, then it is particularly difficult for small articles or parts which are to be manufactured to arrange a number of the inventive injection nozzles in the small available space, since the attachment of such injection nozzles and the mounting thereof is extremely complicated. Apart from this, with such an arrangement of a number of heat conducting cores which are not connected with one another in heat conducting relationship, it is not certain that they all exhibit the same temperature.

In order to prevent these difficulties, the inventive injection nozzle arrangement is advantageously constructed as a multiple-nozzle. In this regard, there are provided at least two delivery channels which extend from a common feed conduit and all of the heat conducting cores are in heat conducting relationship with one another and with the heated distributor plate means. Further, there are advantageously provided a number of injection openings which are arranged coaxially with regard to the axis of symmetry of the injection molding device.

BRIEF DESCRIPTION OF THE DRAWINGS

The invention will be better understood, and objects other than those set forth above, will become apparent, when consideration is given to the following detailed description thereof. Such description makes reference to the annexed drawings wherein like reference numerals have been substantially used throughout to indicate similar or analogous components, and wherein.

DESCRIPTION OF THE PREFERRED EMBODIMENT

Figure 2:
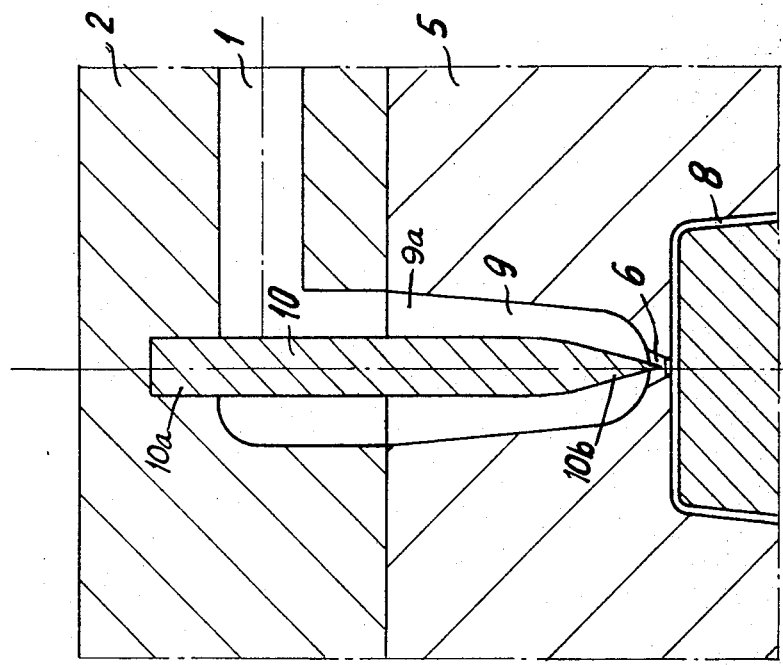
FIGS. 2 to 4 are respective longitudinal sectional views through three different embodiments of inventive injection nozzle arrangements in single constructions.
Figure 1:
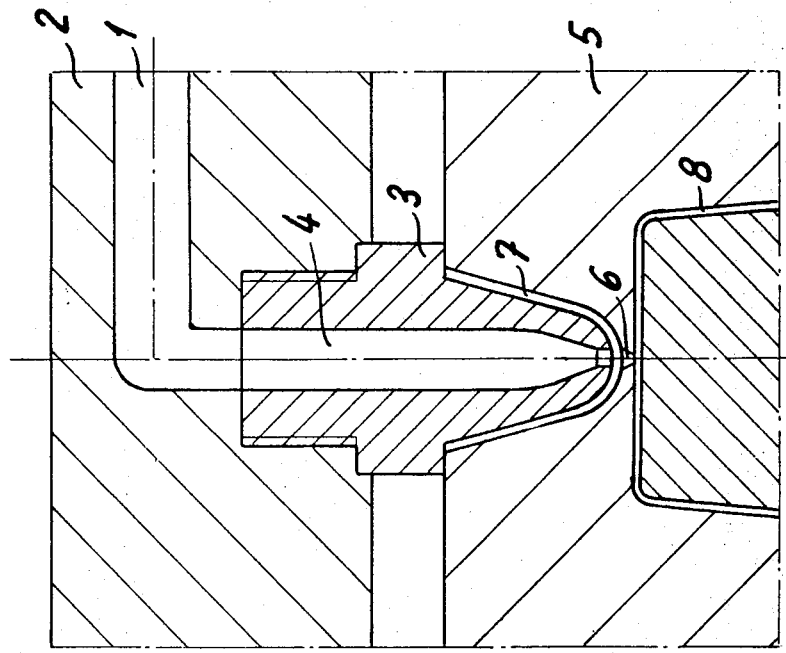
FIG. 1, as already explained, is a sectional view through a prior art construction of an injection nozzle.

Having already had an opportunity to examine the prior art construction of injection nozzle arrangement depicted in FIG. 1, reference will now be made to the remaining FIGS. 2 to 5 illustrating various exemplary embodiments of inventive injection nozzle arrangement for a hot channel-injection molding device. More precisely, in FIG. 2, there is depicted an embodiment of an inventive injection nozzle arrangement in which the delivery channel 9 is formed by a recess 9a which is provided partially at the distributor plate means 2 and partially at the female mold portion 5 or sprue bushing. A heat conducting core 10 with the form of a rod member is arranged in the delivery channel 9. One end 10a of the heat conducting core 9 is secured to the distributor plate means 2, and the free pointed end 10b of such heat conducting core 10 extends into the associated injection opening 6. Owing to this arrangement of the heat conducting core 10 in the heated distributor plate means 2 and further owing to the continuous flow of the hot injection molding material about this heat conducting core 10, the latter remains continuously hot. As a result, such ensures that the injection molding material flowing up to the injection opening or flow channel 6 does not cool off too strongly and remains plastic, so that the thin film in the injection opening 6 which occurs during the injection cycle, and which during each injection molding operation must again be penetrated, can be maintained at a minimum thickness. Owing to the considerable reduction of the thickness of the plastic film in the flow channel or injection opening 6 with respect to the conventional construction of injection nozzles, it is possible to reduce the dimensions of the aforementioned injection opening or flow channel 6 without there occurring the danger of clogging of such injection opening 6.

The thus obtained reduction of the injection location or entrance at the molded article to be manufactured brings about the smallest and cleanest injection locations, which is of extreme importance for molded articles which are to be formed from viscous injection molding material or which should be manufactured from transparent injection molding material. With a construction of the heat conducting core 10 and the delivery channel 9, which is favorable to flow, the inventive injection nozzle arrangement no longer requires as high an injection pressure as with the conventional injection nozzles in order to obtain a faultless filling of the mold cavity 8.

As a result, there is obtained the considerable advantage that the finished product can be produced with smaller internal stress, since each increase of the injection pressure causes greater stresses in the finished article or product.

Figure 3:
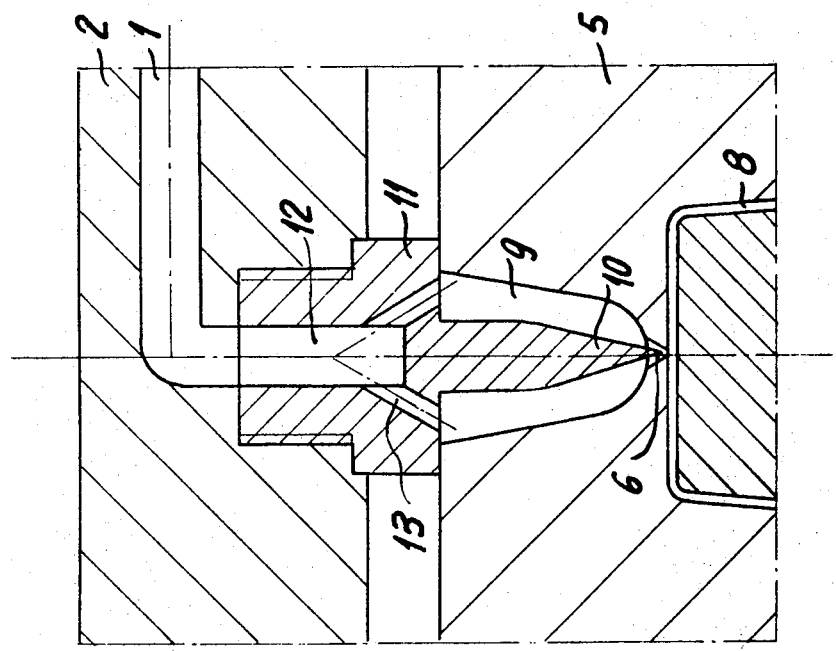

FIG. 3 depicts a second exemplary embodiment of inventive injection nozzle arrangement, wherein the heat conducting core 10 is provided with an attachment member or connecting piece 11 which is sealingly connected with the distributor plate means 2 of the injection molding device. This attachment member 11 is equipped with an axially directed bore 12 and a number of further bores 13 which extend from the first mentioned bore 12 and open into the associated delivery channel 9, in order to deliver to the associated injection opening 6 the material or composition which is to be injection molded. Owing to this arrangement of this embodiment, the length of the heat conducting core 10 is reduced with respect to that of the embodiment according to FIG. 2, whereby any possible lateral displacement of such heat conducting core 10 out of its axial position is rendered extremely difficult.

Figure 4:
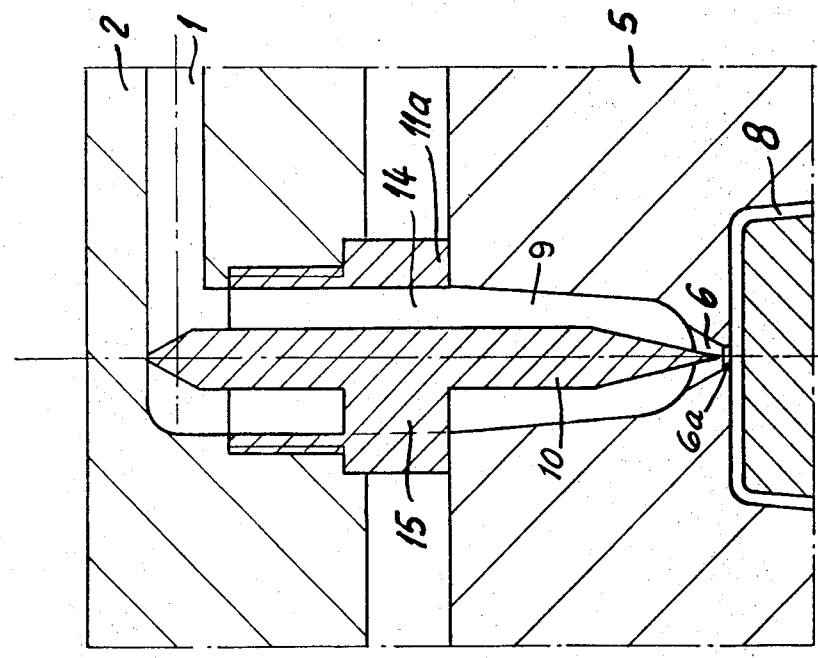

In FIG. 4, there is depicted a further embodiment of inventive injection nozzle in which the heat conducting core 10 is retained by a web 15 or the like provided with a bore 14 arranged substantially parallel to the nozzle axis. Owing to this construction, it is possible to provide a delivery channel 9 having a relatively large cross section.

Advantageously, the flow channel or injection opening 6 includes a substantially cylindrical portion 6a directed toward the side of the mold compartment 8, so that during the formation of a plastic film at the end of an injective cycle, there does not occur any wedge action during ejection or punching out of the film piece from the injection opening of flow channel 6.

The dimensions of the heat conducting core 10 and the delivery channel 9 are advantageously selected in such a manner that, during operation of the injection nozzle, there is formed at the wall of the delivery channel 9 a film consisting of the injection molding material, the thickness of which remains constant during operation and which, similar to the previous hot channel-injection molding nozzles, serves for the thermal insulation of the injection molding material with respect to the surrounding components. Furthermore, the dimensions of the delivery channel are also dependent upon the viscosity of the injection molding material and the throughflow quantity, whereby this throughflow, in turn, is dependent upon the weight of the molded article which is to be manufactured and upon the filling or charging efficiency of the machine.

Additionally, the possibility also exists of arranging the heat conducting core so as to be displaceable along its longitudinal axis. In this regard, it can undertake the function of a closure pin or core for the injection opening 6. This possibility constitutes an essential advantage for the production of large volume plastic components or articles for which, owing to the required large charging volume, there must be contemplated in any case large dimensioned injection locations or entrances. The heat conducting core 10 is advantageously formed from a good heat-conducting material.

Figure 5:
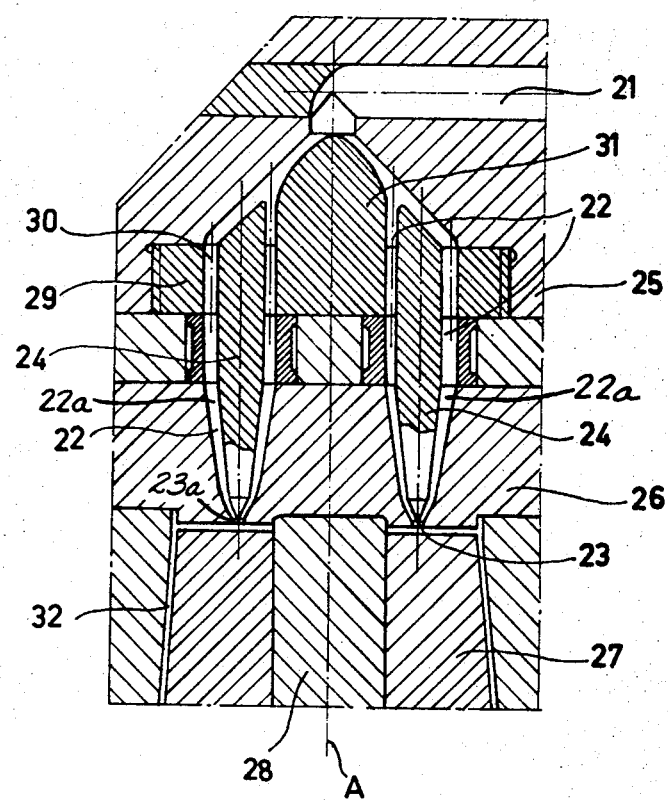
FIG. 5 is a longitudinal sectional view through a further embodiment of inventive injection nozzle arrangement constructed as a multiple-nozzle structure.

Finally, the multiple-nozzle arrangement depicted in FIG. 5 exhibits four delivery channels 22 which are arranged substantially symmetrically and coaxially with respect to the axis of symmetry A of the injection molding device. These four delivery channels 22 communicate with a common supply or feed conduit 21. The injection molding material or composition which is in hot, fluid condition, is delivered from the feed conduit 21 to these delivery channels 22. Further, internally of each delivery channel 22 there is arranged a heat conducting core 24 which extends coaxially with regard to the injection opening 23 of the associated delivery channel 22, and further, which extends into the aforementioned associated injection opening 23. All of the heat conducting core 24 are disposed in heat conducting relationship with respect to one another and with regard to the heated distributor plate means 25. Once again, each of these delivery channels 22 is formed by a respective recess 22a which is partially provided in the distributor plate means 25 and partially in the female mold portion 26 of the injection molding device.

By further referring to FIG. 5, there will be seen the ram-like constructed locking element 28 between the injection opening 23 and which is guided to be axially displaceable in the punch or male mold portion 27. This locking element 28 serves for locking the male mold portion 27 with respect to the female mold portion 26 in the starting or initial phase of the injection molding operation, as such has been set forth in greater detail in my aforementioned co-pending United States application, to which reference may be readily had for this particular aspect which, however, does not form part of the inventive subject matter of this application.

The heat conducting cores 24 are equipped with a coupling or attachment piece 29 which can be sealingly connected with the distributor plate means 25 of the injection molding device. This attachment piece or member 29 is provided with at least one respective bore 30 extending from the feed conduit 21 into each associated delivery channel 22 and each such bore 30 serves to deliver to the associated injection opening 23 the material which is to be injection molded.

Owing to this arrangement of the heat conducting cores 24 in the heated distributor plate means 25, and further, owing to the continuous circulation of the hot injection molding material about such heat, conducting cores 24, the latter always remain hot and exhibit the same temperature.

With a construction favorable to flow of the heat conducting cores 24, their common connecting piece 31 and the delivery channels 22, there is no longer required as high an injection pressure with the inventive multiple-nozzle arrangement as compared to the conventional construction of a multiple-nozzle ararngement, in order to obtain a faultless filling of the mold cavity 32, so that it is possible to manufacture finished products or articles having lower internal stresses. Also, in this case, the injection openings 23 include a portion 23a directed toward the side of the mold cavity 32 which is advantageously of substantially cylindrical configuration.

While there is shown and described present preferred embodiments of the invention, it is to be distinctly understood that the invention is not limited thereto but may be otherwise variously embodied and practiced within the scope of the following claim.

What is claimed is:

1. An injection multiple-nozzle arrangement for a hot channel-injection molding device comprising, in combination:
 (a) a heated distributor plate means;
 (b) an article forming female mold portion cooperating with said heated distributor plate means;
 (c) means providing a plurality of delivery channels for the injection molding material, said providing means for each delivery channel incorporating a recess partially formed in said heated distributor plate means and partially in said female mold portion;
 (d) a single common feed conduit communicating with said delivery channels;
 (e) means disposed at said female mold portion for providing a number of injection openings corresponding to the number of delivery channels;
 (f) a respective heat conducting core located internally of each delivery channel and extending at least throughout a portion of the length of said delivery channel substantially coaxially with respect to and into the associated injection opening; each of said heat conducting cores being in heat conducting relationship with one another and with said heated distributor plate means; and
 (g) said heat conducting cores being provided with an attachment member which can be sealingly connected with said distributor plate means, said attachment member being provided with at least one respective bore communicating said common feed conduit with the associated delivery channels in order to deliver the material to be injection molded into the associated injection openings.

References Cited

UNITED STATES PATENTS

| | | | |
|---|---|---|---|
| 1,517,502 | 12/1924 | Grissom et al. | 222—565 X |
| 1,576,151 | 3/1926 | Slick | 222—565 |
| 2,865,050 | 12/1958 | Strauss | 18—30 |
| 2,878,515 | 3/1959 | Strauss | 18—30 |
| 3,077,636 | 2/1963 | Peters | 18—30 |
| 3,093,865 | 6/1963 | Peters et al. | 18—30 |
| 3,113,346 | 12/1963 | Bright | 18—30 |
| 3,231,938 | 2/1966 | Seymour | 18—30 |
| 2,259,181 | 10/1941 | Shaw et al. | |
| 2,304,461 | 12/1942 | Knowles | 18—30 |

FOREIGN PATENTS

| | | |
|---|---|---|
| 658,976 | 3/1963 | Canada. |
| 1,330,440 | 5/1963 | France. |

J. SPENCER OVERHOLSER, Primary Examiner

MICHAEL O. SUTTON, Assistant Examiner